United States Patent
Zhou et al.

(10) Patent No.: US 11,119,953 B2
(45) Date of Patent: Sep. 14, 2021

(54) DATA ACCESS METHOD AND APPARATUS FOR ACCESSING SHARED CACHE IN A MEMORY ACCESS MANNER

(71) Applicant: HUAWEI TECHNOLOGIES CO., LTD., Shenzhen (CN)

(72) Inventors: Chao Zhou, Hangzhou (CN); Peiqing Zhou, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/743,139

(22) Filed: Jan. 15, 2020

(65) Prior Publication Data

US 2020/0151122 A1    May 14, 2020

Related U.S. Application Data (63) Continuation of application No. PCT/CN2018/090578, filed on Jun. 11, 2018.

(30) Foreign Application Priority Data

Sep. 11, 2017 (CN) .......................... 201710813215.9

(51) Int. Cl.
*G06F 13/00* (2006.01)
*G06F 13/16* (2006.01)
*G06F 9/54* (2006.01)
*G06F 12/084* (2016.01)

(52) U.S. Cl.
CPC .......... *G06F 13/1684* (2013.01); *G06F 9/544* (2013.01); *G06F 12/084* (2013.01); *G06F 13/1663* (2013.01); *G06F 13/1673* (2013.01)

(58) Field of Classification Search
CPC .... G06F 13/1684; G06F 9/544; G06F 12/084; G06F 13/1663; G06F 13/1673; G06F 2212/7201; G06F 2212/7203; G06F 2212/312; G06F 12/0246; G06F 3/06; G06F 3/061; G06F 3/0619; G06F 3/0656
See application file for complete search history.

(56) References Cited

U.S. PATENT DOCUMENTS

| | | | |
|---|---|---|---|
| 9,208,082 B1 * | 12/2015 | Cheriton | G06F 8/312 |
| 2003/0191906 A1 | 10/2003 | Chen et al. | |
| 2004/0193804 A1 * | 9/2004 | Buzby | G06F 12/084 |
| | | | 711/130 |

(Continued)

FOREIGN PATENT DOCUMENTS

| | | |
|---|---|---|
| CN | 1447257 A | 10/2003 |
| CN | 101089829 A | 12/2007 |

(Continued)

*Primary Examiner* — Jing-Yih Shyu
(74) *Attorney, Agent, or Firm* — Maier & Maier, PLLC (57) ABSTRACT

A data access method. The method is applied to a first controller, and the method includes: receiving a destination address sent by each shared cache apparatus, where the destination address is used to indicate an address at which data is to be written into the shared cache apparatus; receiving information carrying the data; and sending the destination address and the data to the shared cache apparatus that sends the destination address, so that each shared cache apparatus stores the data in storage space to which the destination address points.

13 Claims, 4 Drawing Sheets

(56) References Cited

U.S. PATENT DOCUMENTS

| | | | |
|---|---|---|---|
| 2006/0075197 A1* | 4/2006 | Shimada | G06F 13/1663 |
| | | | 711/150 |
| 2010/0138612 A1* | 6/2010 | Wei | G06F 12/084 |
| | | | 711/130 |
| 2015/0142996 A1 | 5/2015 | Lu | |
| 2016/0283414 A1 | 9/2016 | Hashimoto et al. | |
| 2016/0306552 A1 | 10/2016 | Liu et al. | |
| 2017/0220255 A1* | 8/2017 | Yan | G06F 3/065 |
| 2018/0165014 A1 | 6/2018 | Jiang et al. | |

FOREIGN PATENT DOCUMENTS

| | | |
|---|---|---|
| CN | 102567227 A | 7/2012 |
| CN | 103106048 A | 5/2013 |
| CN | 105991756 A | 10/2016 |
| EP | 3037950 A1 | 6/2016 |
| JP | 2016-177751 A | 10/2016 |
| WO | 2017/092015 A1 | 6/2017 |

* cited by examiner

DATA ACCESS METHOD AND APPARATUS FOR ACCESSING SHARED CACHE IN A MEMORY ACCESS MANNER

CROSS-REFERENCE TO RELATED APPLICATIONS

This application is a continuation of International Patent Application No. PCT/CN2018/090578, filed on Jun. 11, 2018, which claims priority to Chinese Patent Application No. 201710813215.9, filed on Sep. 11, 2017. The disclosures of the aforementioned applications are hereby incorporated by reference in their entireties.

TECHNICAL FIELD

This application relates to the field of data access, and more specifically, to a data access method and an apparatus.

BACKGROUND

A dual-controller disk array system includes two controllers and a disk array separately connected to the two controllers. The two controllers communicate with each other by using an external bus, for example, communicating with each other by using a peripheral component interconnect express (PCIE) bus. In an operating process of the dual-controller disk array system, data of one of the two controllers is synchronized to the other controller as a backup. When one of the two controllers is faulty, the data may be recovered from the other controller, so as to avoid loss of the data. The disk array includes a plurality of physical disks, and the two controllers manage the disk array together.

An existing dual-controller disk array system further includes a shared cache apparatus connected to two controllers, and each controller communicates with the shared cache apparatus by using an external bus, for example, communicating with the shared cache apparatus by using a PCIE bus. When data synchronization between the two controllers is implemented, after one controller receives, by using an internal bus, information carrying data, the controller converts a communication format of the information into an external bus format, and sends, to the shared cache apparatus by using the external bus, the information whose communication format is converted into the external bus format, so as to implement data synchronization between the two controllers. Transmission efficiency of a manner in which a controller converts a communication format to send information to the shared cache apparatus is low, and a speed of accessing the shared cache apparatus is slow. As a result, a speed at which a host stores, in the disk array, data that is in the shared cache apparatus is slow.

SUMMARY

Embodiments provide a data access method and an apparatus to improve a speed of accessing a shared cache device by a host.

According to a first aspect, a data access method is provided where the data access method is applied to a storage system, the storage system includes a first controller, the storage system further includes at least one shared cache apparatus, the first controller is connected to each of the at least one shared cache apparatus by using an internal bus, the method is applied to the first controller, and the method includes: receiving a destination address sent by each shared cache apparatus, where the destination address is used to indicate an address at which data is to be written into the shared cache apparatus; receiving information carrying the data; and sending the destination address and the data to the shared cache apparatus that sends the destination address, so that each shared cache apparatus stores the data in storage space to which the destination address points.

Optionally, in this embodiment, the internal bus includes at least one of the following internal buses: a quick path interconnect (QPI) bus, an ultra path interconnect (UPI) bus, a hyper transport (HT) bus, or a global memory interconnect (GMI) bus.

Therefore, a controller (for example, the first controller) is connected to the shared cache apparatus by using an internal bus, so that a host can access the shared cache apparatus in a memory access manner, thereby improving a speed of accessing the shared cache apparatus by the host.

With reference to the first aspect, in a possible implementation of the first aspect, sending the destination address and the data to the shared cache apparatus that sends the destination address includes: generating a write data instruction, where the write data instruction includes the data and the destination address; and sending the write data instruction to the shared cache apparatus that sends the destination address.

With reference to the first aspect, in a possible implementation of the first aspect, the first controller includes a control cache module, and sending the destination address and the data to the shared cache apparatus that sends the destination address includes: storing the data in the control cache module; generating a write data instruction, where the write data instruction includes a source address and the destination address, and the source address is an address of the data stored in the control cache module; and sending the write data instruction to the shared cache apparatus that sends the destination address, so that each shared cache apparatus reads the data from the control cache module based on the source address and stores the data in the storage space to which the destination address points.

According to a second aspect, a data access method is provided where the data access method is applied to a storage system, the storage system includes a first controller, the storage system further includes at least one shared cache apparatus, the first controller is connected to each of the at least one shared cache apparatus by using an internal bus, the method is applied to any one of the at least one shared cache apparatus, and the method includes: sending a destination address to the first controller, where the destination address is used to indicate an address at which data is to be written into the shared cache apparatus; receiving the destination address and the data that are sent by the first controller; and storing the data in storage space to which the destination address points.

Optionally, in this embodiment, the internal bus includes at least any one of the following internal buses: a QPI bus, a UPI bus, HT bus, and a GMI bus.

Therefore, a controller (for example, the first controller) is connected to the shared cache apparatus by using an internal bus, so that a host can access the shared cache apparatus in a memory access manner, thereby improving a speed of accessing the shared cache apparatus by the host.

With reference to the second aspect, in a possible implementation of the second aspect, receiving the destination address and the data that are sent by the first controller includes: receiving a write data instruction sent by the first controller, where the write data instruction includes the data and the destination address.

With reference to the second aspect, in a possible implementation of the second aspect, the first controller includes a control cache module, and receiving the destination address and the data that are sent by the first controller includes: receiving a write data instruction sent by the first controller, where the write data instruction includes a source address and the destination address, and the source address is an address of the data stored in the control cache module; reading the data from the control cache module based on the source address; and storing the data at the destination address.

With reference to the second aspect, in a possible implementation of the second aspect, the shared cache apparatus includes a processing module and a non-volatile cache module, the non-volatile cache module includes a non-volatile memory (NVM) medium, and the non-volatile cache module is connected to the processing module; receiving the destination address and the data that are sent by the first controller includes: receiving, by using the processing module, the destination address and the data that are sent by the first controller; and storing the data in storage space to which the destination address points includes: storing the data in the non-volatile cache module by using the processing module, where the non-volatile cache module includes the storage space to which the destination address points.

The non-volatile storage medium is configured in the shared cache apparatus, so as to avoid a data loss problem caused by an abnormal power failure.

With reference to the second aspect, in a possible implementation of the second aspect, the shared cache apparatus includes a processing module, a non-volatile cache module, and a shared memory. The non-volatile cache module includes an NVM medium, and the shared memory and the non-volatile cache module are separately connected to the processing module. Receiving the destination address and the data that are sent by the first controller includes: receiving, by using the processing module, the destination address and the data that are sent by the first controller; and storing the data in storage space to which the destination address points includes: storing the data in the shared memory by using the processing module; and when a data volume of the shared memory reaches a threshold, storing, in the non-volatile cache module by using the processing module, the data that is in the shared memory, where the cache unit includes the storage space to which the destination address points.

The shared memory is configured in the shared cache apparatus, and the shared memory may be used as a buffer storage medium of the non-volatile cache module, so as to reduce a frequency of accessing the non-volatile cache module, and further reduce internal wear of the NVM storage medium.

Optionally, the shared memory is a dynamic random access memory (RAM).

According to a third aspect, a controller is provided where the controller is configured in a storage system, the storage system includes at least one shared cache apparatus, the controller is connected to each of the at least one shared cache apparatus by using an internal bus, and the controller includes: a receiving module configured to receive a destination address sent by each shared cache apparatus, and further configured to receive information carrying the data, where the destination address is used to indicate an address at which the data is to be written into the shared cache apparatus; and a sending module configured to send the destination address and the data to the shared cache apparatus that sends the destination address, so that each shared cache apparatus stores the data in storage space to which the destination address points. The controller is configured to perform the data access method performed by the controller according to any one of the first aspect or the possible implementations of the first aspect.

According to a fourth aspect, a controlling device is provided where the controlling device is configured in a storage system, the storage system includes at least one shared cache apparatus, the controlling device is connected to each of the at least one shared cache apparatus by using an internal bus, and the controlling device includes: a receiver, configured to receive a destination address sent by each shared cache apparatus and receive information carrying the data, where the destination address is used to indicate an address at which the data is to be written into the shared cache apparatus; and a transmitter configured to send the destination address and the data to the shared cache apparatus that sends the destination address, so that each shared cache apparatus stores the data in storage space to which the destination address points. The controlling device is configured to perform the data access method performed by the controller according to any one of the first aspect or the possible implementations of the first aspect.

According to a fifth aspect, a computer readable storage medium is provided where the computer readable storage medium stores a computer program, and when the program is executed by a processor, the method according to any one of the first aspect or the possible implementations of the first aspect is implemented.

According to a sixth aspect, a shared cache apparatus is provided where the shared cache apparatus is configured in a storage system, the storage system includes a first controller, the first controller is connected to the shared cache apparatus by using an internal bus, and the shared cache apparatus includes: a transceiver module configured to: send a destination address to the first controller; receive the destination address and the data that are sent by the first controller, where the destination address is used to indicate an address at which the data is to be written into the apparatus; and a processing module configured to store the data in storage space to which the destination address points. The shared cache apparatus is configured to perform the data access method performed by the shared cache apparatus according to any one of the first aspect or the possible implementations of the first aspect.

According to a seventh aspect, a shared cache device is provided where the shared cache device is configured in a storage system, the storage system includes a first controller, the first controller is connected to the shared cache device by using an internal bus, and the shared cache device includes: a transceiver, configured to send a destination address to the first controller, and further configured to receive the destination address and the data that are sent by the first controller, where the destination address is used to indicate an address at which the data is to be written into the apparatus; and a processor configured to store the data in storage space to which the destination address points. The shared cache device is configured to perform the data access method performed by the shared cache apparatus according to any one of the first aspect or the possible implementations of the first aspect.

According to an eighth aspect, a storage system is provided, where the storage system includes the controller in the third aspect and implementations of the third aspect, and where the controller is a first controller. The storage system further includes at least one shared cache apparatus in the sixth aspect and implementations of the sixth aspect, where the first controller is connected to each of the at least one shared cache apparatus by using an internal bus.

With reference to the eighth aspect, in a possible implementation of the ninth aspect, the storage system further includes a second controller, the second controller is connected to each of the at least one shared cache apparatus by using an internal bus, and the shared cache apparatus is configured to: when the first controller is faulty, receive a read data instruction sent by the second controller; query the data; and send the data to the second controller.

DESCRIPTION OF EMBODIMENTS

The following describes technical solutions of this application with reference to the accompanying drawings.

Figure 1:
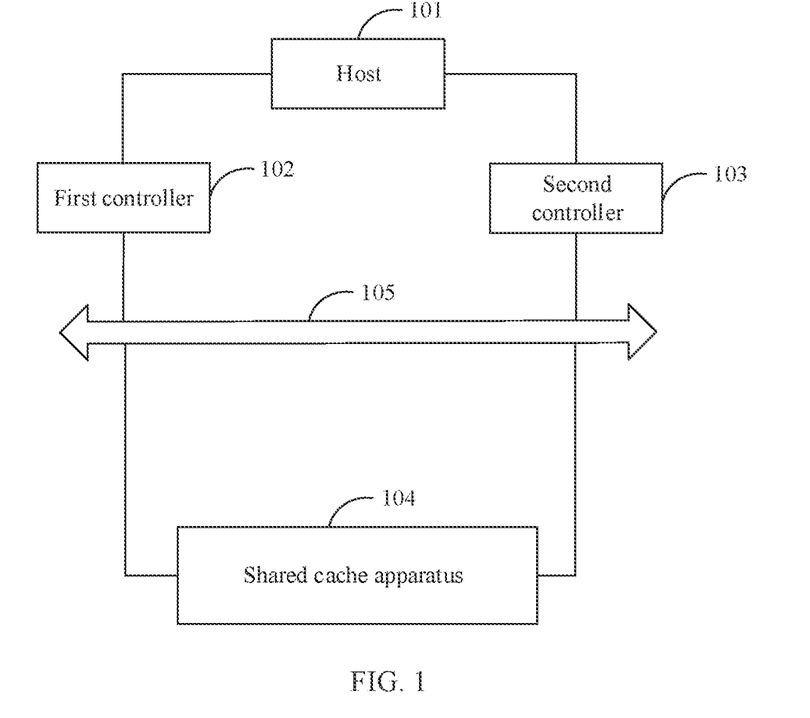
FIG. 1 is a schematic diagram of a storage system according to an embodiment.

As shown in FIG. 1, a storage system 100 includes at least a host 101, a first controller 102, a second controller 103, and at least one shared cache apparatus 104. The host 101 is separately connected to the first controller 102 and the second controller 103, and the first controller 102 and the second controller 103 are separately connected to each of the at least one shared cache apparatus 104 by using an internal bus 105.

Optionally, in this embodiment, the internal bus includes at least any one of the following internal buses: a QPI bus, a UPI bus, a HT bus, and a GMI bus.

The host 101 may be any computing device such as a server or a desktop computer. The server may be a high-density server, a rack server, or a blade server.

Figure 2:
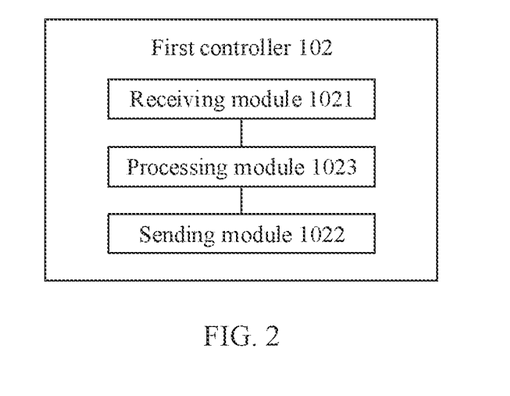
FIG. 2 is a schematic block diagram of a controller according to an embodiment.

Optionally, as shown in FIG. 2, the first controller 102 includes a receiving module 1021, a sending module 1022, and a processing module 1023. The processing module 1023 is separately connected to the receiving module 1021 and the sending module 1022.

In the first controller 102 shown in FIG. 2, the receiving module 1021 is configured to receive a destination address sent by the shared cache apparatus 104. The destination address is used to indicate an address at which data is to be written into the shared cache apparatus 104.

The receiving module 1021 is further configured to receive information carrying the data.

The processing module 1023 is configured to parse the information carrying the data, to obtain the data.

The sending module 1022 is configured to send the data and the destination address to the shared cache apparatus 104, so as to instruct the shared cache apparatus 104 to write the data into storage space to which the destination address points.

Figure 3:
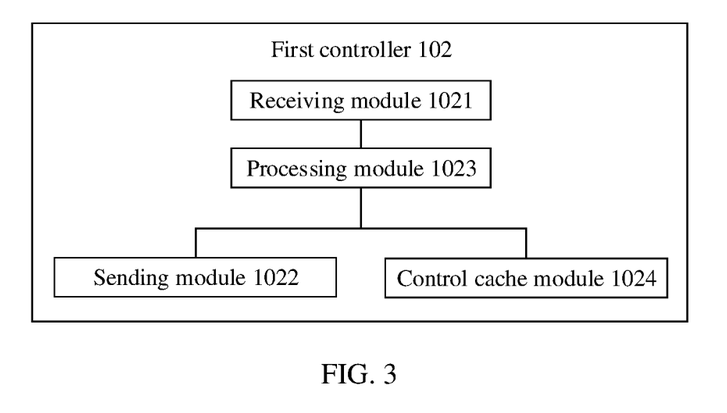
FIG. 3 is another schematic block diagram of a controller according to an embodiment.

Optionally, as shown in FIG. 3, based on the first controller 102 shown in FIG. 2, the first controller 102 may further include a control cache module 1024. The control cache module 1024 is connected to the processing module 1023, and the processing module 1023 first stores, in the control cache module 1024, the data to be written into the shared cache apparatus 104.

The sending module 1022 is further configured to send a source address and the destination address to the shared cache apparatus 104. The source address is an address of the data stored in the control cache module 1024. The shared cache apparatus 104 reads the data from the control cache module 1024 based on the source address, and writes the data into the storage space that is of the shared cache apparatus 104 and to which the destination address of the data points.

Figure 4:
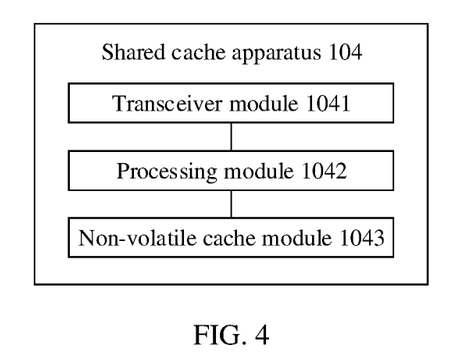
FIG. 4 is a schematic block diagram of a shared cache apparatus according to an embodiment.

Optionally, as shown in FIG. 4, the shared cache apparatus 104 includes a transceiver module 1041, a processing module 1042, and a non-volatile cache module 1043. The processing module 1042 is separately connected to the transceiver module 1041 and the non-volatile cache module 1043. The transceiver module 1041 is configured to send a destination address in the shared cache apparatus 104 to the first controller 102, and is further configured to receive the data and the destination address of the data that are sent by the first controller 102. The processing module 1042 is configured to: determine the destination address, of the data, that is received by the transceiver module 1041, and store the data in storage space that is of the non-volatile cache module 1043 and to which the destination address points.

Figure 5:
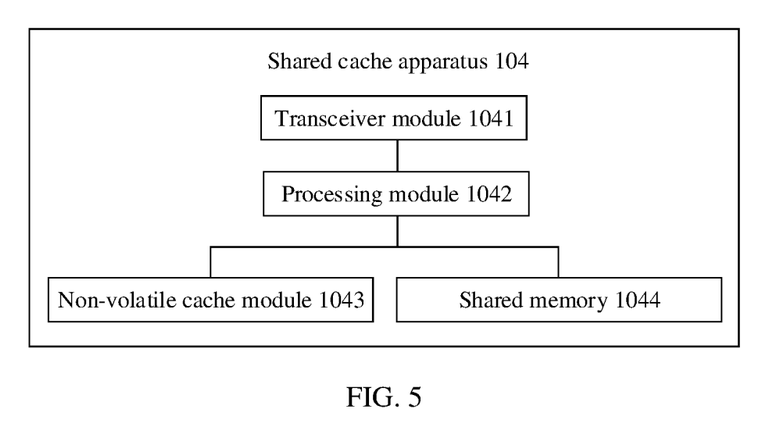
FIG. 5 is another schematic block diagram of a shared cache apparatus according to an embodiment.

Optionally, as shown in FIG. 5, based on the shared cache apparatus 104 shown in FIG. 5, the shared cache apparatus 104 further includes a shared memory 1044, and the shared memory 1044 is connected to the processing module 1042. After receiving the data and the destination address, the processing module 1042 is configured to store the data in the shared memory 1044. When a volume of data stored in the shared memory 1044 reaches a data volume threshold, all the data stored in the shared memory 1044 is written, at one time, into the storage space that is of the non-volatile cache module 1043 and to which the destination address points.

Optionally, the shared memory 1044 is a dynamic random access memory (DRAM).

The DRAM has a problem that storage data is lost in the event of a power failure. Therefore, when the shared cache apparatus 104 is configured with the DRAM, to avoid the data loss problem caused by an abnormal power failure, the shared cache apparatus 104 may be configured with a backup power supply. The backup power supply is used to supply power to the DRAM when the abnormal power failure occurs. As an example instead of a limitation, the DRAM may be a super capacitor.

The shared cache apparatus 104 is configured with the shared memory 1044. The shared memory 1044 may be used as a buffer storage medium of the non-volatile cache module 1043, so as to reduce a frequency of accessing the non-volatile storage medium, and further reduce internal wear of the NVM storage medium.

Figure 6:
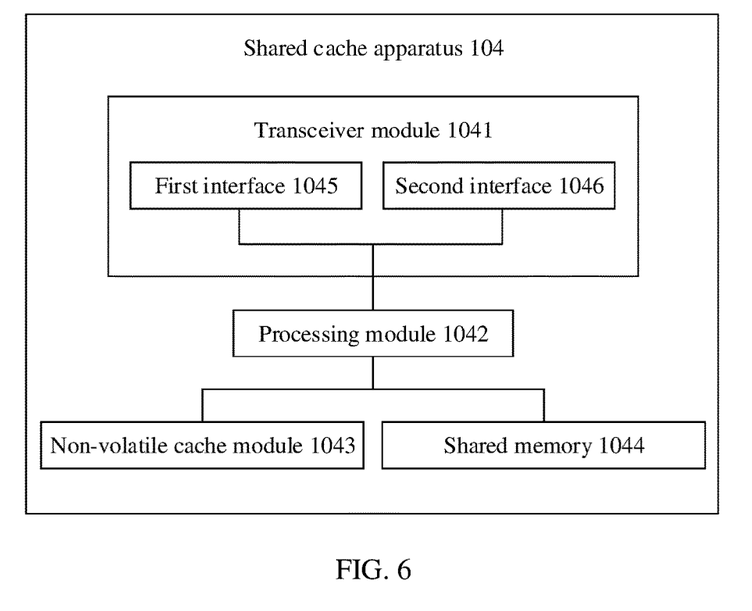
FIG. 6 is still another schematic block diagram of a shared cache apparatus according to an embodiment.

Optionally, as shown in FIG. 6, the transceiver module 1041 in the shared cache apparatus 104 may further include a first interface 1045 and a second interface 1046. The first controller 102 is connected to the shared cache apparatus 104 by using the first interface 1045 of the shared cache apparatus 104, and the second controller 103 is connected to the shared cache apparatus 104 by using the second interface 1046 of the shared cache apparatus 104. The first interface 1045 is configured to: receive the data and the destination address of the data that are sent by the first controller 102, and send the data and the destination address of the data to the processing module 1042 in the shared cache apparatus 104. The processing module 1042 processes the data and the destination address of the data that are received, determines, based on the destination address, that the data needs to be stored in the storage space of the shared cache apparatus 104, and stores the data in the storage space that is of the non-volatile cache module 1043 and to which the destination address points.

The following uses communication between the shared cache apparatus 104 and the first controller 102 as an example to describe a data access method provided in the embodiments.

Figure 7:
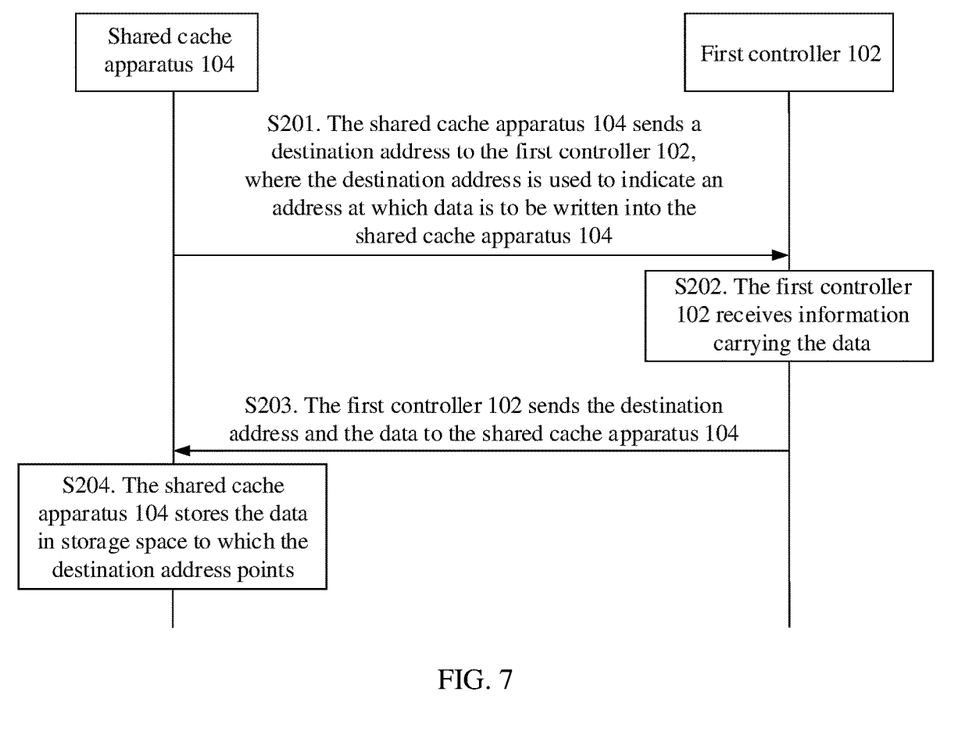
FIG. 7 is a schematic flowchart of a data access method according to an embodiment.

FIG. 7 is a schematic flowchart of a data access method according to an embodiment. As shown in FIG. 7, step S201 in the data access method may be performed by the shared cache apparatus 104 shown in FIG. 1, FIG. 4, or FIG. 5, or may be performed by the transceiver module 1041 in the shared cache apparatus 104 shown in FIG. 4. Step S202 in the data access method may be performed by the first controller 102 or the second controller 103 shown in FIG. 1, or may be performed by the receiving module 1021 shown in FIG. 2. Step S203 in the data access method may be performed by the first controller 102 or the second controller 103 shown in FIG. 1, or may be performed by the sending module 1022 shown in FIG. 2, or may be performed through cooperation by the processing module 1023 and the sending module 1022 shown in FIG. 2. Step S204 in the data access method may be performed by the shared cache apparatus 104 shown in FIG. 1, FIG. 4, or FIG. 5, or may be performed by the processing module 1042 of the shared cache apparatus 104 shown in FIG. 5. This is not limited in this embodiment.

S201. The shared cache apparatus 104 sends a destination address to the first controller 102, where the destination address is used to indicate an address at which data is to be written into the shared cache apparatus 104.

The first controller 102 maps, to global storage space of a storage system based on the destination address, storage space to which the destination address in the shared cache apparatus 104 points, and stores a mapping relationship between the destination address in the shared cache apparatus 104 and a logical address of the shared cache apparatus 104. The logical address of the shared cache apparatus 104 indicates an address layout, in the global storage space of the storage system, of the storage space corresponding to the destination address in the shared cache apparatus 104.

The destination address includes a start address and an end address of storage space to which a continuous physical address points or an identifier of the shared cache apparatus 104.

In an example and not as a limitation, the storage space corresponding to the destination address is the storage space to which the continuous physical address points.

When the system is powered on or restarted, the shared cache apparatus 104 sends the destination address to the first controller 102. The destination address includes a start address and an end address of the storage space of the shared cache apparatus 104. The first controller 102 maps the storage space of the shared cache apparatus 104 to the global storage space of the system based on the start address and the end address. When the first controller 102 maps the storage space corresponding to the destination address in the shared cache apparatus 104 to the global storage space of the storage system, the first controller 102 creates the logical address of the shared cache apparatus 104, and stores the mapping relationship between the logical address of the shared cache apparatus 104 and the destination address of the shared cache apparatus 104. In this way, the destination address is a physical address of the storage space of the shared cache apparatus 104. After each controller stores a mapping relationship table, the physical address of the storage space of the shared cache apparatus 104 is visible to each controller, and each controller may perform storage processing by using the physical address of the storage space of the shared cache apparatus 104.

For example, the start address included in the destination address is 0 G, and the end address included in the destination address is 128 G. The first controller 102 maps, to the global storage space of the system based on the destination address, storage space corresponding to a range from 0 G to 128 G. For example, the storage space, of the shared cache apparatus 104, that is corresponding to the range from 0 G to 128 G is mapped by the first controller 102 to storage space, of the global storage space, that is corresponding to a range from 80 G to 208 G, and an address corresponding to the range from 80 G to 208 G is the logical address of the shared cache apparatus 104.

It can be noted that the foregoing description operates by using an example in which the destination address includes the start address and the end address of the storage space of the shared cache apparatus 104. However, this embodiment is not limited thereto.

Optionally, the destination address includes the identifier of the shared cache apparatus 104 and a storage capacity of the storage space of the shared cache apparatus 104. The first controller 102 maps the storage space of the shared cache apparatus 104 to the global storage space based on the storage capacity of the storage space of the shared cache apparatus 104.

After the first controller 102 creates the mapping relationship between the logical address of the shared cache apparatus 104 and the destination address of the shared cache apparatus 104, the first controller 102 may configure the mapping relationship table for the shared cache apparatus 104 by using a basic input/output system (BIOS) of the first controller 102. In this way, the address layout, in the global storage space of the storage system, of the storage space of the shared cache apparatus 104 is visible to the shared cache apparatus 104.

Optionally, the destination address includes the identifier of the shared cache apparatus 104. The identifier of the shared cache apparatus 104 may be either a number of the shared cache apparatus 104 or a communication address of the shared cache apparatus 104. This is not limited in this embodiment. The first controller 102 prestores the storage capacity of the shared cache apparatus 104. The first controller 102 may obtain, based on the identifier of the shared cache apparatus 104, the prestored storage capacity of the shared cache apparatus 104 through querying. After mapping the storage space of the shared cache apparatus 104 to the global storage space based on the storage capacity of the shared cache apparatus 104, the first controller 102 stores a mapping relationship between the identifier of the shared cache apparatus 104 and the logical address of the shared cache apparatus 104.

It can be noted that in this embodiment, the foregoing performs description by using an example in which the first controller 102 obtains information about the storage space of the shared cache apparatus 104 by receiving the destination address sent by the shared cache apparatus 104. However, this embodiment is not limited thereto.

For example, the first controller 102 can further obtain, by using the basic input/output system (BIOS) of the first controller 102, the destination address of the shared cache apparatus 104 when the system is powered on or restarted.

S202. The first controller 102 receives information carrying the data.

For example, after the first controller 102 receives the destination address through step S201, the first controller 102 receives the information that carries the data and that is sent by a host 101, and the data is data to be written into the shared cache apparatus 104.

After receiving the information carrying the data, the first controller 102 parses the information carrying the data to obtain the data. The first controller 102 determines the logical address at which the data is to be stored in the global storage space of the storage system, and determines, based on the mapping relationship table between the logical address of the shared cache apparatus 104 and the identifier of the shared cache apparatus 104, the shared cache apparatus 104 into which the data is to be written.

Optionally, based on step S201, after the first controller 102 receives the destination address including the start address and the end address, if the first controller 102 creates the mapping relationship table between the logical address of the shared cache apparatus 104 and the destination address of the shared cache apparatus 104, the first controller 102 may determine, based on the mapping relationship table between the logical address of the shared cache apparatus 104 and the destination address of the shared cache apparatus 104, the storage space to which the destination address at which the data is to be stored in the shared cache apparatus 104 points. The storage space to which the destination address of the shared cache apparatus 104 points is storage space within a range from the start address to the end address.

For example, the first controller 102 first determines, based on the mapping relationship table between the logical address of the shared cache apparatus 104 and the destination address of the shared cache apparatus 104 in step S201, that the logical address at which the data is to be stored in the global storage space of the storage system is located within the range from 80 G to 208 G. The first controller 102 then determines, based on a mapping relationship between the logical address, of the shared cache apparatus 104, that is corresponding to the range from 80 G to 208 G and the destination addresses, of the shared cache apparatus 104, that is corresponding to the range from 0 G to 128 G, that the storage space to which the destination address of the shared cache apparatus 104 in which the data is to be stored points is storage space within the address range, of the shared cache apparatus 104, that is from 0 G to 128 G.

S203. The first controller 102 sends the destination address and the data to the shared cache apparatus 104, so that the shared cache apparatus 104 stores the data in the storage space to which the destination address points.

For example, in step S203, the first controller 102 sends, to the shared cache apparatus 104, information carrying the destination address, so as to implement sending of the destination address. Based on description of step S201, the destination address includes the start address and the end address of the storage space to which the continuous physical address points, or includes the identifier of the shared cache apparatus 104.

In addition to sending the destination address and the data, the first controller 102 further sends an effective length of the data to the shared cache apparatus 104, where the effective length of the data indicates a size of storage space that the data needs to occupy, so as to instruct the shared cache apparatus 104 to allocate the storage space corresponding to the size indicated by the effective length of the data to store the data.

Optionally, in another implementation of step S203, the first controller 102 generates a write data instruction, where the write data instruction includes the data and the destination address of the data (for example, the destination address of the data is the start address and the end address of the storage space or the identifier of the shared cache apparatus 104), and the first controller 102 sends the write data instruction to the first shared cache apparatus 104.

Optionally, in another implementation of step S203, the first controller 102 may further generate a write data instruction, where the write data instruction includes the data, the destination address of the data (for example, the destination address of the data is the start address of the storage space or the identifier of the shared cache apparatus 104), and the effective length of the data. The first controller 102 sends the write data instruction to the shared cache apparatus 104.

Optionally, in another implementation of step S203, an optional implementation in which the first controller 102 sends the data to the shared cache apparatus 104 is as follows. The first controller 102 first stores the data in the control cache module 1024, and generates a write data instruction, where the write data instruction includes a source address and the destination address at which the data is to be written into the shared cache apparatus 104, the source address is a storage location of the data in the control cache module 1024; and the first controller 102 sends the write data instruction to the shared cache apparatus 104, so that the shared cache apparatus 104 reads the data from the control cache module 1024 based on the source address.

S204. The shared cache apparatus 104 stores the data in the storage space to which the destination address points.

After receiving the destination address and the data that are sent by the first controller 102, the shared cache apparatus 104 stores the data in the storage space to which the destination address points.

For example, the shared cache apparatus 104 stores, for example using any of the following four implementation methods, the data in the storage space to which the destination address points.

Method 1:

When the destination address sent by the first controller 102 to the shared cache apparatus 104 includes the identifier of the shared cache apparatus 104, the shared cache apparatus 104 stores the data in the shared cache apparatus 104 upon determining that the received identifier of the shared cache apparatus 104 is consistent with the identifier stored by the shared cache apparatus 104.

Method 2:

When the destination address of the data includes the start address and the end address of the storage space to which the continuous physical address points, the shared cache apparatus 104 directly stores the data in the storage space, of the shared cache apparatus 104, that is indicated by the destination address.

Method 3:

If the destination address of the shared cache apparatus 104 includes the start address and the end address of the storage space to which the continuous physical address points, and includes the identifier of the shared cache apparatus 104, the shared cache apparatus 104 directly stores, upon determining, based on the identifier, that the identifier is consistent with the identifier stored by the shared cache apparatus 104, the data in the storage space, of the shared cache apparatus 104, that is indicated by the destination address.

Method 4:

Based on step S201, if the first controller 102 configures the mapping relationship table between the logical address of the shared cache apparatus 104 and the destination address of the shared cache apparatus 104 for the shared cache apparatus 104 by using the BIOS of the first controller 102, when the destination address sent by the first controller 102 to the shared cache apparatus 104 includes the identifier and the logical address that are of the shared cache apparatus 104, the shared cache apparatus 104 may first query the mapping relationship table upon determining, based on the identifier, that the identifier is consistent with the identifier stored by the shared cache apparatus 104. The first controller 102 can then determine the corresponding destination address based on the logical address of the shared cache apparatus 104 and store the data in the storage space to which the destination address of the shared cache apparatus 104 points.

Optionally, the destination address sent by the first controller 102 to the shared cache apparatus 104 includes the identifier of the shared cache apparatus 104. In addition to sending the destination address to the shared cache apparatus 104, the first controller 102 further sends, to the shared cache apparatus 104, the logical address at which the data is to be stored in the global storage space. When the shared cache apparatus 104 first determines, based on the identifier, that the identifier is consistent with the identifier stored in the shared cache apparatus 104, the shared cache apparatus 104 further determines, based on the foregoing mapping relationship table that is between the logical address of the shared cache apparatus 104 and the destination address of the shared cache apparatus 104 and that is configured by the first controller 102 for the shared cache apparatus 104, an offset, relative to a start logical address, of the logical address at which the data is to be stored in the global storage space, and determines, based on the offset, the physical address at which the data is to be stored in the shared cache apparatus 104, and finally stores the data in the storage space, of the shared cache apparatus 104, to which the physical address points.

It can be noted that the start logical address may be a start logical address of the global storage space (for example, the start logical address of the global storage space is 0 G), or the start logical address may be a start logical address obtained after the destination address of the shared cache apparatus 104 is mapped to the global storage space (for example, the start logical address obtained after the destination address of the shared cache apparatus 104 is mapped to the global storage space is 90 G). This is not limited in this application.

Optionally, the host 101 may be connected to a plurality of shared cache apparatuses 104, and any two of the plurality of shared cache apparatuses 104 form mirrored shared cache apparatuses. For example, reading and writing access performed by the host 101 on one of the two shared cache apparatuses 104 may also occur between the host 101 and the other shared cache apparatus 104, so that same data may be stored in one of the two shared cache apparatuses 104, and may also be stored in the other shared cache apparatus 104. In this way, a data loss problem caused by a fault of one of the two shared cache apparatuses 104 is avoided. In other words, data storage reliability is improved.

Two interfaces of one of the two shared cache apparatuses 104 are respectively connected to the first controller 102 and the second controller 103. Similarly, two interfaces of the other shared cache apparatus 104 are also respectively connected to the first controller 102 and the second controller 103. In other words, each controller is connected to two interfaces, and the two interfaces are one interface of one of the two shared cache apparatuses 104 and one interface of the other shared cache apparatus 104.

It can be noted that in this embodiment, the example description is performed by using an example in which the first controller 102 configures the mapping relationship table between the logical address of the shared cache apparatus and the physical address of the shared cache apparatus for the shared cache apparatus 104 by using the BIOS of the first controller 102. However, this embodiment is not limited thereto. For example, the first controller 102 may further send the mapping relationship table and the information carrying the data to the shared cache apparatus 104 together.

An embodiment provides a controller (for example, the first controller 102), and a schematic block diagram of the controller is shown in FIG. 2 and FIG. 3. For brevity, details are not described herein again. The following only describes operations performed by modules shown in FIG. 2 and FIG. 3.

The receiving module 1021 is configured to receive a destination address sent by each shared cache apparatus 104, where the destination address is used to indicate an address at which data is to be written into the shared cache apparatus 104.

The receiving module 1021 is further configured to:
receive information carrying the data.
The sending module 1022 is configured to:
send the destination address and the data to the shared cache apparatus 104 that sends the destination address, so that each shared cache apparatus 104 stores the data in storage space to which the destination address points.

Optionally, the first controller 102 further includes:
the processing module 1023, configured to generate a write data instruction, where the write data instruction includes the data and the destination address, where
the sending module 1022 is further configured to:
send the write data instruction to the shared cache apparatus 104 that sends the destination address.

Optionally, the first controller 102 further includes the control cache module 1024, and the processing module 1023 is further configured to:
store the data in the control cache module 1024; and
generate a write data instruction, where the write data instruction includes a source address and the destination address, and the source address is an address of the data stored in the control cache module 1024; and
the sending module 1022 is further configured to:
send the write data instruction to the shared cache apparatus 104 that sends the destination address, so that each shared cache apparatus 104 reads the data from the control cache module 1024 based on the source address and stores the data in the storage space to which the destination address points.

It can be understood that the processing module 1023 in this embodiment may be implemented by a processor or a processor-related circuit component, the receiving module 1021 may be implemented by a receiver or a receiver-related circuit component, and the sending module 1022 may be implemented by a transmitter or a transmitter-related circuit component.

Figure 8:
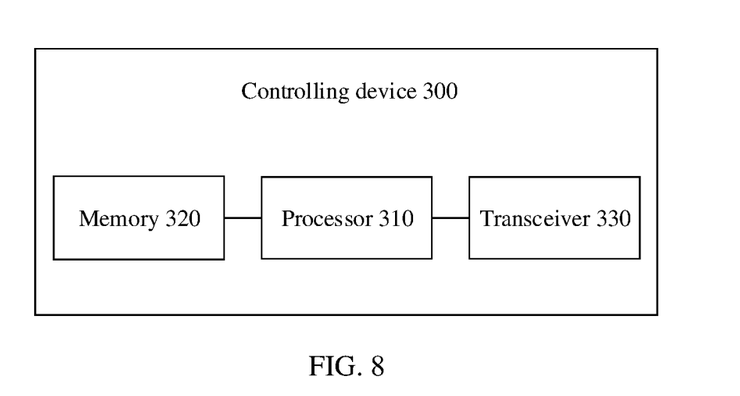
FIG. 8 is a schematic block diagram of a controlling device according to an embodiment.

As shown in FIG. 8, an embodiment further provides a controlling device 300. The controlling device 300 includes a processor 310, a memory 320, and a transceiver 330. The memory 320 stores an instruction or a program, the memory 320 is further configured to perform an operation performed by the control cache module 1024 in the foregoing embodiment, and the processor 310 is configured to execute the instruction or the program stored in the memory 320. When the instruction or the program stored in the memory 320 is executed, the processor 310 is configured to perform an operation performed by the processing module 1023 in the foregoing embodiment, and the transceiver 330 is configured to perform an operation performed by the receiving module 1021 or the sending module 1022 in the foregoing embodiment.

An embodiment provides a shared cache apparatus 104, and a schematic block diagram of the shared cache apparatus 104 is shown in FIG. 4 to FIG. 6. For brevity, details are not described herein again. The following only describes operations performed by modules shown in FIG. 4 to FIG. 6. The transceiver module 1041 is configured to send a destination address to the first controller 102, where the destination address is used to indicate an address at which data is to be written into the shared cache apparatus 104.

The transceiver module 1041 is further configured to:
receive the destination address and the data that are sent by the first controller 102.

The processing module 1042 is configured to store the data in storage space to which the destination address points.

Optionally, the transceiver module 1041 is further configured to:
receive a write data instruction sent by the first controller 102, where the write data instruction includes the data and the destination address.

Optionally, the first controller 102 includes a control cache module 1024, and the transceiver module 1041 is configured to:
receive a write data instruction sent by the first controller 102, where the write data instruction includes a source address and the destination address, and the source address is an address of the data stored in the control cache module 1024; and
the processing module 1042 is further configured to:
read the data from the control cache module based on the source address; and
store the data at the destination address.

Optionally, the shared cache apparatus 104 further includes the non-volatile cache module 1043, the non-volatile cache module 1043 includes an NVM medium, and the non-volatile cache module 1043 is connected to the processing module 1042;
the transceiver module 1041 is further configured to:
receive the destination address and the data that are sent by the first controller 102; and
the processing module 1042 is further configured to:
store the data in the non-volatile cache module 1043, where the non-volatile cache module 1043 includes the storage space to which the destination address points.

Optionally, the apparatus further includes the non-volatile cache module 1043 and the shared memory 1044, where the non-volatile cache module 1043 includes an NVM medium, and the shared memory 1044 and the non-volatile cache module 1043 are separately connected to the processing module 1042;
the transceiver module 1041 is further configured to:
receive the destination address and the data that are sent by the first controller 102; and
the processing module 1042 is further configured to:
store the data in the shared memory 1044; and
when a data volume of the shared memory 1044 reaches a threshold, store, in the non-volatile cache module 1043, the data that is in the shared memory 1044, where the non-volatile cache module 1043 includes the storage space to which the destination address points.

It can be understood that the processing module 1042 in this embodiment may be implemented by a processor or a processor-related circuit component, and the transceiver module 1041 may be implemented by a transceiver or a transceiver-related circuit component.

Figure 9:
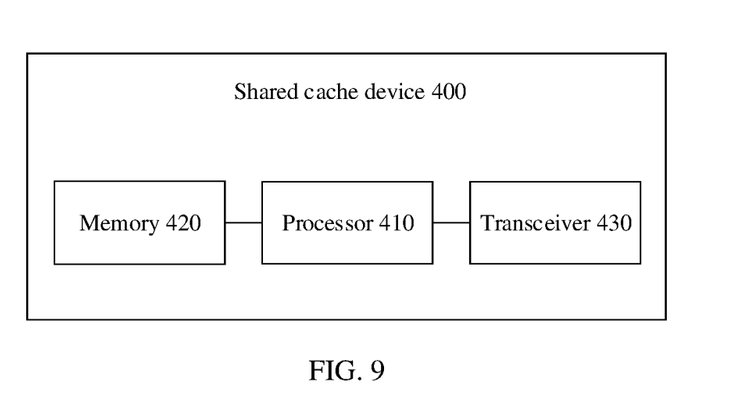
FIG. 9 is a schematic block diagram of a shared cache device according to an embodiment.

As shown in FIG. 9, an embodiment further provides a shared cache device 4400. The shared cache device 400 includes a processor 410, a memory 420, and a transceiver 430. The memory 420 stores an instruction or a program, the memory 420 is further configured to perform operations performed by the non-volatile cache module 1043 and the shared memory 1044 in the foregoing embodiment, and the processor 410 is configured to execute the instruction or the program stored in the memory 420. When the instruction or the program stored in the memory 420 is executed, the processor 410 is configured to perform an operation performed by the processing module 1042 in the foregoing embodiment, and the transceiver 430 is configured to perform an operation performed by the transceiver module 1041 in the foregoing embodiment.

A person of ordinary skill in the art may be aware that, in combination with the examples described in the embodiments, units and algorithm steps may be implemented by electronic hardware or a combination of computer software and electronic hardware. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be understood by a person of ordinary skill in the art that, for the purpose of convenient and brief description, for a detailed working process of the foregoing system, apparatus, and unit, reference can be made to a corresponding process in the foregoing method embodiments. Details are not described herein again.

In the several embodiments provided in this application, it can be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments. The foregoing storage medium includes any medium that can store program code, such as a USB flash drive, a removable hard disk, a read-only memory (ROM), a RAM, a magnetic disk, or an optical disc.

The foregoing descriptions are merely implementations and embodiments, but are not intended to limit the protection scope of this application. Any variation or replacement readily determined by a person of ordinary skill in the art within the technical scope disclosed in this application shall fall within the protection scope of this application.

What is claimed is:

1. A data access method implemented by a first controller, comprising:
   receiving a destination address sent by at least one shared cache apparatus, wherein the first controller is connected to the at least one shared cache apparatus by using an internal bus and the destination address is used to indicate an address at which data is to be written into the at least one shared cache apparatus;
   receiving information carrying the data; and
   sending the destination address and the data to the at least one shared cache apparatus that sends the destination address, so that the at least one shared cache apparatus stores the data in storage space to which the destination address points,
   wherein the first controller configures a mapping relationship for the destination address of the at least one shared cache apparatus by using a basic input and output system (BIOS) of the first controller so that the at least one shared cache apparatus is accessed by the first controller in a memory access manner,
   wherein the sending of the destination address and the data to the at least one shared cache apparatus that sends the destination address comprises:
   generating a write data instruction comprising the data and the destination address; and
   sending the write data instruction to the at least one shared cache apparatus that sends the destination address.

2. The method according to claim 1, wherein the internal bus comprises at least one of: a quick path interconnect (QPI) bus, an ultra path interconnect (UPI) bus, a hyper transport (HT) bus, or a global memory interconnect (GMI) bus.

3. The method according to claim 1, wherein the first controller comprises a control cache module, and the sending of the destination address and the data to the at least one shared cache apparatus that sends the destination address comprises:
   storing the data in the control cache module;
   generating a write data instruction comprising a source address and the destination address, and the source address is an address of the data stored in the control cache module; and
   sending the write data instruction to the at least one shared cache apparatus that sends the destination address, so that the at least one shared cache apparatus reads the data from the control cache module based on the source address and stores the data in the storage space to which the destination address points.

4. The method according to claim 1, wherein the first controller configures the mapping relationship by using the BIOS when a system is powered on or restarted, such that an address layout of the at least one shared cache apparatus is visible in a global storage space of the system.

5. A data controlling device, the data controlling device configured in a storage system, the storage system comprising at least one shared cache apparatus, the data controlling device connected to each of the at least one shared cache apparatus using an internal bus, the data controlling device comprising:
   a receiver configured to receive a destination address sent by the at least one shared cache apparatus, wherein a first controller is connected to the at least one shared cache apparatus using an internal bus, and the destination address is used to indicate an address at which data is to be written into the at least one shared cache apparatus; and the receiver is further configured to receive information carrying the data; and
   a transmitter configured to send the destination address and the data to the at least one shared cache apparatus that sends the destination address, so that the at least one shared cache apparatus stores the data in storage space to which the destination address points,
   wherein the first controller configures a mapping relationship for the destination address of the at least one shared cache apparatus by using a basic input and output system (BIOS) of the first controller so that the at least one shared cache apparatus is accessed by the first controller in a memory access manner,
   wherein the data controlling device further comprises:
   a processor configured to generate a write data instruction, wherein the write data instruction comprises the data and the destination address, and
   the transmitter is further configured to send the write data instruction to the at least one shared cache apparatus that sends the destination address.

6. The data controlling device according to claim 5, wherein the internal bus comprises at least one of: a quick path interconnect (QPI) bus, an ultra path interconnect (UPI) bus, a hyper transport (HT) bus, or a global memory interconnect (GMI) bus.

7. The data controlling device according to claim 5, wherein the data controlling device further comprises:
   a control buffer; and
   a processor configured to store the data in the control buffer and generate a write data instruction, wherein the write data instruction comprises a source address and the destination address, and the source address is an address of the data stored in the control buffer; and
   the transmitter is further configured to send the write data instruction to the at least one shared cache apparatus that sends the destination address so that the at least one shared cache apparatus reads the data from the control buffer based on the source address and stores the data in the storage space to which the destination address points.

8. A data storage system, comprising:
a first controller and at least one shared cache apparatus, and
the first controller is configured to:
receive a destination address sent by the at least one shared cache apparatus among the at least one shared cache apparatus, wherein the first controller is connected to the at least one shared cache apparatus by using an internal bus, wherein the destination address is used to indicate an address at which data is to be written into the at least one shared cache apparatus; and
receive information carrying the data; and
send the destination address and the data to the at least one shared cache apparatus that sends the destination address; wherein
the data storage system comprises a plurality of shared cache apparatuses including the at least one shared cache apparatus, and each of the plurality of shared cache apparatuses is configured to send a destination address to the first controller, wherein the destination address is used to indicate an address at which data is to be written into the plurality of shared cache apparatuses, receive the destination address and the data that are sent by the first controller, and store the data in storage space to which the destination address points,
wherein the first controller configures a mapping relationship for the destination address of the at least one shared cache apparatus by using a basic input and output system (BIOS) of the first controller so that the at least one shared cache apparatus is accessed by the first controller in a memory access manner,
wherein the first controller is further configured to:
generate a write data instruction, wherein the write data instruction comprises the data and the destination address, and
send the write data instruction to the at least one shared cache apparatus that sends the destination address.

9. The data storage system according to claim 8, wherein the internal bus comprises at least one of: a quick path interconnect (QPI) bus, an ultra path interconnect (UPI) bus, a hyper transport (HT) bus, or a global memory interconnect (GMI) bus.

10. The data storage system according to claim 8, wherein the first controller is further configured to:
store the data in a control cache module;
generate a write data instruction, wherein the write data instruction comprises a source address and the destination address, and the source address is an address of the data stored in the control cache module; and
send the write data instruction to the at least one shared cache apparatus that sends the destination address, so that the at least one shared cache apparatus reads the data from the control cache module based on the source address and stores the data in the storage space to which the destination address points.

11. The data storage system according to claim 8, wherein each of the at least one shared cache apparatus is further configured to receive a write data instruction sent by the first controller, and wherein the write data instruction comprises the data and the destination address.

12. The data storage system according to claim 8, wherein each of the at least one shared cache apparatus is further configured to:
receive a write data instruction sent by the first controller, wherein the write data instruction comprises a source address and the destination address, and the source address is an address of the data stored in a control cache module;
read the data from the control cache module based on the source address; and
store the data at the destination address.

13. The data storage system according to claim 8, wherein the plurality of shared cache apparatuses comprise a non-volatile cache module, and the non-volatile cache module comprises a non-volatile memory (NVM) medium; and
the each of the plurality of shared cache apparatuses is further configured to:
receive the destination address and the data that are sent by the first controller; and
store the data in a non-volatile cache module by using a processing module, wherein the non-volatile cache module comprises the storage space to which the destination address points.

* * * * *